United States Patent
Hong et al.

(10) Patent No.: US 8,724,652 B2
(45) Date of Patent: May 13, 2014

(54) APPARATUS AND METHOD FOR DETERMINATION OF FRAME STRUCTURE FOR REDUCING INTERFERENCE IN FREQUENCY REUSE SYSTEM USING COGNITIVE RADIO

(75) Inventors: Dae-Sik Hong, Seoul (KR); Go-San Noh, Seoul (KR); Han-Ho Wang, Seoul (KR); Jun-Ho Jo, Anyang (KR); Yong-Ho Seok, Anyang (KR); Byoung-Hoon Kim, Anyang (KR)

(73) Assignee: Industry-Academic Cooperation Foundation, Yonsei University, Seoul (KR)

(*) Notice: Subject to any disclaimer, the term of this patent is extended or adjusted under 35 U.S.C. 154(b) by 176 days.

(21) Appl. No.: 13/322,885

(22) PCT Filed: Nov. 3, 2009

(86) PCT No.: PCT/KR2009/006434
§ 371 (c)(1),
(2), (4) Date: Feb. 7, 2012

(87) PCT Pub. No.: WO2010/137777
PCT Pub. Date: Dec. 2, 2010

(65) Prior Publication Data
US 2012/0128043 A1    May 24, 2012

Related U.S. Application Data

(60) Provisional application No. 61/181,674, filed on May 28, 2009.

(51) Int. Cl.
*H04W 74/08*    (2009.01)

(52) U.S. Cl.
USPC ........................................... 370/462

(58) Field of Classification Search
USPC .................. 370/431, 432, 445, 458, 461, 462
See application file for complete search history.

(56) References Cited

U.S. PATENT DOCUMENTS

| | | | |
|---|---|---|---|
| 2003/0166404 A1 | 9/2003 | Chuang et al. | |
| 2006/0109813 A1* | 5/2006 | Saito et al. | 370/329 |
| 2006/0171353 A1* | 8/2006 | Nagata et al. | 370/329 |
| 2007/0002804 A1* | 1/2007 | Xiong et al. | 370/335 |
| 2007/0058661 A1* | 3/2007 | Chow | 370/445 |
| 2008/0089280 A1 | 4/2008 | Hu | |
| 2008/0089389 A1 | 4/2008 | Hu | |
| 2009/0074032 A1 | 3/2009 | Callaway et al. | |
| 2009/0247201 A1* | 10/2009 | Ye et al. | 455/509 |
| 2010/0172369 A1* | 7/2010 | Ohmi | 370/445 |

* cited by examiner

*Primary Examiner* — Paul H Masur
(74) *Attorney, Agent, or Firm* — Ladas & Parry, LLP

(57) ABSTRACT

Disclosed are an apparatus and method for determining a frame structure for reducing interference between users using the same frequency band in a communication system using a cognitive radio, the method including, collecting channel status information related to a primary user with a priority to occupancy of a predetermined frequency band, executing spectrum sensing for the frequency band to check whether the primary user's traffic exists, deciding a length of a data frame to be transmitted in consideration of interference to the primary user based upon the collected channel status information if a channel in which the primary user's traffic is not present is sensed through the spectrum sensing, constructing a data frame based upon the decided frame length to transmit via the sensed channel, and re-executing the spectrum sensing for the channel, if data to be additionally transmitted exists, and rechecking whether the primary user's traffic is present.

7 Claims, 3 Drawing Sheets

APPARATUS AND METHOD FOR DETERMINATION OF FRAME STRUCTURE FOR REDUCING INTERFERENCE IN FREQUENCY REUSE SYSTEM USING COGNITIVE RADIO

CROSS-REFERENCE TO RELATED APPLICATIONS

This application is a 371 U.S. national stage application of International Application No. PCT/KR2009/006434, filed on Nov. 3, 2009, which claims priority to U.S. Provisional Application Ser. No. 61/181,674, filed on May 28, 2009, the contents of which are incorporated by reference herein in their entirety.

TECHNICAL FIELD

The present invention relates to a frequency reuse system using a cognitive radio, and more particularly, an apparatus and method for determining a frame structure for reducing interference between users using the same frequency band in a communication system using a cognitive radio.

BACKGROUND ART

As communication technologies are improved and various communication services are developed, it is requested for the communication systems to allocate additional frequency bands.

However, there is no room for the next generation communication service to allocate the available low frequency bands, because almost frequency bands are already licensed and allocated for the existing broadcast and communication services.

In order to overcome such problem of the lack of available low frequencies, a cognitive radio (hereinafter, referred to as 'CR') has been proposed. The CR is capable of detecting an empty frequency within a licensed frequency band and using the temporarily empty frequency adaptively.

The spectrum sensing of the CR is executed to coexist a primary user (licensed user) with priority and a secondary user (unlicensed user) without priority upon the spectral use. The secondary user may determine whether the primary user has occupied any frequency band through the sensing of frequency spectrum so as to prevent a collision occurrence upon using the same frequency with the primary user.

FIG. 1 shows a transmission of data frames using the spectrum sensing of the CR technology.

The spectrum sensing may repeat sensing operation and transmission operation with respect to a frequency occupation of the primary user as shown in FIG. 1. If data transmission is needed to the secondary user, spectrum sensing is executed for the frequency band F to check whether there is a transmission opportunity to the secondary user. After executing the spectrum sensing for the frequency band F during a sensing time $n_D$, the secondary user starts transmission if there is not detected any packet transmission of the primary user.

However, if the transmitted data of the secondary user are all sent at once, there is no way to check whether the primary user occupies the channel during the data transmission of the secondary user. Accordingly, as shown in FIG. 1, a data packet is split into several packets 101, 103 and 105 and sensing is executed in each section between the split data packets. If a packet which is being transmitted from or to the primary user is not detected, the secondary user temporarily occupies the channel again so as to transmit data.

Therefore, the procedure of transmitting data by the second user has a repeating operation of 'sensing ($n_D$)-transmission (t1)-sensing ($n_D$)-transmission (t2)-sensing ($n_D$)-transmission (t3)'.

According to the existing approach, the repeating operation of sensing and transmitting has a structure in which a length of sensing slot and transmission slot are always uniformly repeated.

However, the periodical sensing approach has a drawback of failing to reflect the increased probability that the primary user will come back to the channel as time elapses after a secondary user starts data transmission. Consequently, when the secondary user transmits data for a long period of time, the collision probability between the data transmission of secondary user and the primary user may problematically increase.

Referring to FIG. 1, during a transmission time interval t3 of the third frame 105 of the secondary user, the primary user occupies a channel to transmit a packet 200, thereby causing the collision 109 between the transmission packet 200 of the primary user and the transmission packet 105 of the secondary user.

DISCLOSURE OF INVENTION

Solution to Problem

In order to address such problem, the present invention provides a frame structure capable of reducing a length of a transmission slot with the lapse of the transmission time so as to reduce the interference between a primary user and a secondary user.

To achieve these and other advantages and in accordance with the purpose of the present invention, as embodied and broadly described herein, there is provided a data communication method in a frequency reuse communication system using a cognitive radio, the method including, collecting channel status information of a predetermined frequency band that is licensed or allocated to a primary user by receiving the channel status information from a base station or by measuring the channel status, executing spectrum sensing for the predetermined frequency band to check whether the primary user's traffic exists, deciding a length of a frame of data to be transmitted in consideration of interference to the primary user based upon the collected channel status information if a channel in which the primary user's traffic is not present is sensed through the spectrum sensing, transmitting the data based upon the decided frame length through the sensed channel; and re-executing the spectrum sensing for the channel, if data to be additionally transmitted exists, and checking whether the primary user's traffic is present.

In accordance with one embodiment of the present invention, there is provided a data communication apparatus in a frequency reuse communication system using a cognitive radio, the apparatus including, a receiver for receiving a channel status information of a primary user, wherein the primary user has a high priority to occupancy of a predetermined frequency band; a spectrum sensing unit configured to execute spectrum sensing for the frequency band to check whether data traffic of the primary user is exist; a controller configured to receive the sensed result from the spectrum sensing unit, retrieve a channel in which the primary user's traffic is not present based upon the sensed result, and decide a frame length of a data to be transmitted in consideration of interference to the primary user based upon the received channel status information from the receiver; and a transmitter for transmitting the data based upon the decided frame length through the channel; wherein the controller divides the data to be transmitted into a plurality of data frames, and a length of each of the divided data frames becomes gradually shorter than a length of the initially-divided frame.

MODE FOR THE INVENTION

Figure 1:
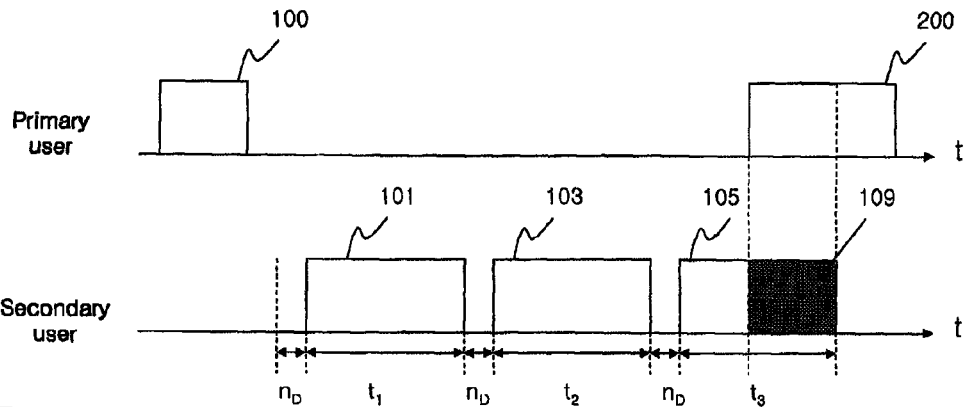
FIG. 1 shows a transmission of data frames using the spectrum sensing of the CR technology.

Hereinafter, description will be given in detail of the preferred embodiments of the present invention with reference to the accompanying drawings. Here, the same or similar components will have the same reference numerals, irrespective of the drawings, and the repeated description thereof will be omitted. Also, if it is considered that the detailed description of the well-known technologies associated with the present invention may make the main points of the present invention obscure, the detailed description will be omitted. Furthermore, the accompanying drawings are merely intended to help understanding of the scope of the present invention. Therefore, it should be regarded that the accompanying drawings should not be construed to limit the scope of the present invention thereby.

Hereinafter, a term 'user' is used, but the user can also be called as terminal, subscriber station (CS), user equipment (UE), mobile equipment (ME) and mobile station (MS). Also, the user may denote portable equipment having communication functions, such as personal digital assistant (PDA), smart phone, notebook and the like, or non-portable equipment, such as personal computer (PC) or navigator.

A frequency reuse system according to the present invention may include frequency reuse environments in heterogeneous wireless communication systems and homogeneous wireless communication systems.

For example, the heterogeneous communication systems may comprise a wireless local area network (WLAN) and a long term evolution (LTE) network which use a frequency band F overlapped with each other. Unlicensed or low priority user of the WLAN system may occupy and reuse the frequency band F dynamically by sensing the frequency band F whether licensed or high priority user of the LTE system has occupied the overlapped frequency band, according to the present invention.

The homogeneous communication systems may comprise a hierarchical cell structure (HCS). The HCS has a hierarchical configuration including a macrocell supporting larger coverage and a microcell supporting smaller coverage. The HCS may provide a coverage extension of service and improvement of frequency efficiency by frequency reuse. In case where the macrocell and the microcell of the HCS use the same frequency resource, it may be occurred to the interference.

However, by employing a frame structure according to the present invention, the microcell user that has low priority or without a priority for using the overlapped frequency senses whether the macrocell user has occupied the frequency periodically so as to dynamically occupy and use the frequency, thereby enabling the frequency reuse.

The HCS is discussed in the 3GPP LTE standard, which is being discussed as the next generation mobile communication standard. Also the HCS is discussed in the LTE standard as a home eNode B, which is the concept of femtocell.

The present invention takes in account of the frequency reuse environments both in different types of systems (heterogeneous network) and in the same type systems (homogeneous network). Hereinafter, regarding an overlapped frequency band in the heterogeneous network and the homogenous network, a high priority or licensed user for an overlapped frequency is defined as 'Primary user', and a low priority or unlicensed user for the overlapped frequency is defined as 'Secondary user'.

Figure 2:
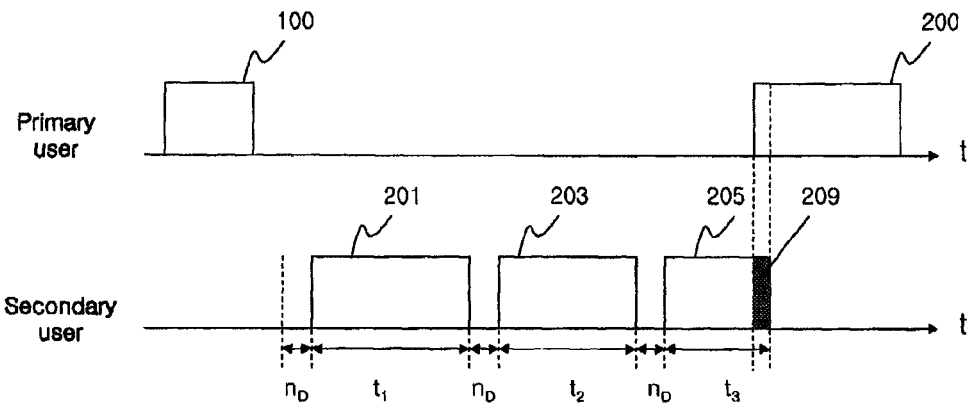
FIG. 2 shows a transmission of data frames adapting a frame structure capable of reducing the interference between users in accordance with one embodiment of the present invention.

FIG. 2 shows a transmission of data frames adapting a frame structure capable of reducing the interference between users in accordance with one embodiment of the present invention.

As aforementioned with reference to FIG. 1, the related art has used the structure in which a slot length $n_D$ for spectrum sensing and a slot length $x_K$ for data transmission are uniformly repeated.

However, the present invention proposes a frame structure in which a slot length for data transmission is continuously reduced by considering the high probability that a primary user will come back to a channel as time elapses after a secondary user starts transmission.

Similar to FIG. 1, the secondary user in FIG. 2 performs spectrum sensing for a frequency F by use of the CR technology in order to reuse the frequency F that has already allocated or licensed to the primary user. The primary user does not use the frequency F for a predetermined time after completely transmitting a traffic 100, then the secondary user senses the frequency F which is not currently occupied by the primary user through the spectrum sensing $n_D$. Here, data which the secondary user desires to transmit are not transmitted at once but instead divided into several frames, and each section for re-performing the spectrum sensing $n_D$ is defined between the adjacent divided frames.

That is, the transmitting data is formed several sub-frames, wherein each of the subframe length are gradually decreased.

The slot lengths t1, t2 and t3 for the data transmission of the three transmission frames 101, 103 and 105 are all the same in the related art as shown in FIG. 1. Whereas, shown in FIG. 2, the slot lengths t1, t2 and t3 for data transmission of three transmission frames 201, 202 and 203 are gradually reduced.

Hence, if the primary user comes back to a channel within the transmission time interval t3 of the third frame 205 of the secondary user and transmits the frame 200, a section 209 in which the frame 200 comes into collision with the transmission frame 205 of the secondary user becomes considerable short, compared to the section 109 of the collision occurred of FIG. 1.

Thereby remarkably reducing the probability of the collision occurrence as compared to the related art.

As shown in FIG. 2, the length of the data frame of the secondary user, which is gradually shortened as time elapses, can be calculated by use of several traffic models, in consideration of the probability that a data traffic generation for the primary user.

The present invention considers three traffic models of a data traffic generation for the primary user, namely, uniform distribution, exponential distribution and Pareto distribution.

The uniform distribution denotes that a traffic arrival probability of the primary user exhibits a uniform distribution as time elapses.

The succeeding traffic arrival probability $P^{unif}(t)$ of the primary user, which is increased as time elapses after the complete channel occupancy due to the preceding traffic 100 of the primary user, can be written as the following equation 1, MathFigure 1

$$P^{unif}(t) = \frac{t}{T_{max}} \qquad [\text{Math. 1}]$$

where $T_{max}$ denotes a maximum traffic idle period of the primary user.

The exponential distribution denotes that the primary user's traffic arrival probability is exponentially increased as time elapses. The succeeding traffic arrival probability $P^{exp}(t)$ of the primary user according to the exponential distribution can be expressed as the following equation 2, MathFigure 2

$$P^{exp}(t) = 1 - e^{\lambda t} \qquad [\text{Math.2}]$$

where $\lambda$ denotes an average traffic arrival rate of the primary user.

The exponential distribution is usually used as a model for a voice data, and has an advantage of easy analysis with making the most use of the characteristic of an actual traffic environment compared to other models.

The Pareto distribution is a distribution based upon Pareto's law, and also expressed as a distribution based upon 80-20 rule. This Pareto distribution is a modeling scheme perceived from a phenomenon that 80% of effects comes from 20% of causes. The succeeding traffic arrival probability $P^{par}(t)$ of the primary user according to the Pareto distribution model can be expressed as the following equation 3, MathFigure 3

$$P^{par}(t) = 1 - \left(\frac{m}{t}\right)^\alpha \qquad [\text{Math. 3}]$$

where m denotes a minimal value of an idle period, and $\alpha$ denotes a value to determine average and dispersion.

The Pareto distribution is good to characterize the distribution model having a self-similar characteristic, such as Internet traffic or the like. The Pareto distribution exhibits a characteristic of a long tail distribution, and in some cases, has an infinite average or distribution value.

Figure 3:
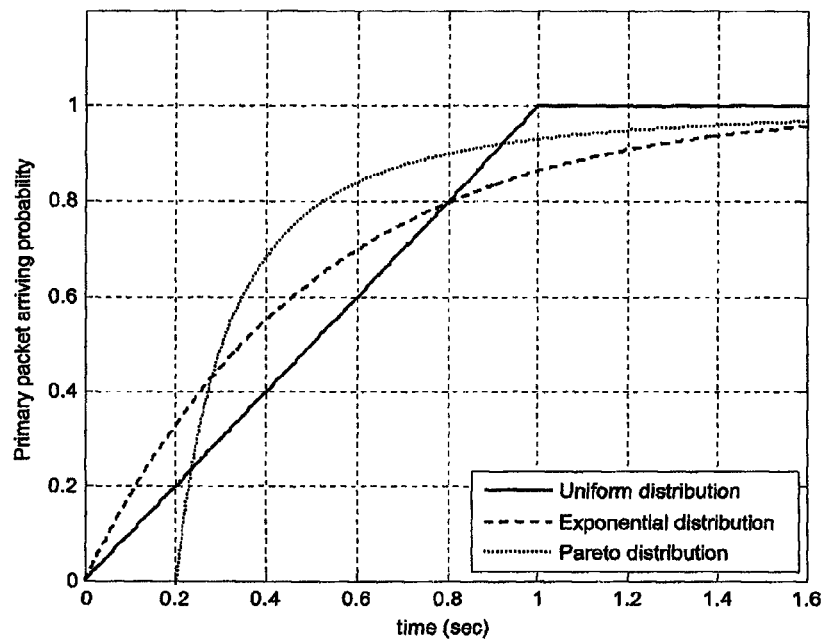
FIG. 3 shows a view illustrating a primary users data traffic arrival probability according to traffic models.

FIG. 3 shows a packet arrival probability based on the three traffic models of a data traffic generation for the primary user, that is, uniform distribution, exponential distribution and Pareto distribution.

Hereinafter, description will be given of an optimization method for maximizing the secondary user's traffic throughput and minimizing a collision between the primary user and the secondary user based upon the primary user's traffic models as defined above.

An average data transmission time for the secondary user $\phi_k$, assuming that the average data transmission time can be obtained from a $k^{th}$ data slot of the secondary user is $\phi_k$, may be denoted as the following equation 4, by using each packet arrival probability P(t) of the primary user defined by Equations 1 to 3 and a beginning time $b_k$ of the $k^{th}$ data slot of the secondary user.

In the following equation, $T_s$ denotes a symbol period of a signal, that is, an interval between each sample of a digital signal.

MathFigure 4

$$\Phi_k = A\int_{b_k T_s}^{(b_k + x_k)T_s}(1 - p(t))dt \qquad [\text{Math. 4}]$$

That is, a time interval as long as a transmittable data slot length $x_k$ excluding a collision time may be an available data transmission time of the secondary user's traffic.

Meanwhile, if no collision occurs, a data throughput $C_0$ of the secondary user may be obtained, as shown in Equation 5, by Shannon's channel capacity equation using the secondary user's signal-to-noise ratio (SNR) $\gamma_s$.

MathFigure 5

$$C_0 = \log_2(1+\gamma_s) \qquad [\text{Math.5}]$$

Also, assuming that an average collision time that the primary user undergoes due to the secondary user's transmission within the $k^{th}$ data slot is $\Psi_k$, $\Psi_k$ can be defined as the following equation 6.

MathFigure 6

$$\Psi_k = A\int_{b_k T_s}^{(b_k + x_k)T_s} p(t)dt \qquad [\text{Math. 6}]$$

Therefore, the optimization method for maximizing the throughput of the secondary user and minimizing the collision between the primary user and the secondary user can be expressed as the following equation 7, by using Equations 4 to 6, wherein the primary user's idle period rate $P_{idle}$, an average idle period T and an average collision time limits $\eta_k$.

MathFigure 7

$$\max_{\{x_k\}} \frac{P_{idle}}{T} \sum_{k=0}^{K-1} \phi_k C_0 \qquad [\text{Math. 7}]$$
$$\text{s.t. } \Psi_k D \eta_k,$$
$$k = 0, 1, \ldots, K-1$$

Calculating an average data transmission time $\phi_k$ for each traffic distribution by the optimization method defined in Equation 7, it can be obtained by the following equation 8.

MathFigure 8

$$\phi_k = \qquad [\text{Math. 8}]$$

$$\begin{cases} x_k T_s - \dfrac{T_s^2}{2T_{max}}(2b_k x_k + x_k^2) & \text{Unif.distribution} \\[6pt] -e^{-\lambda b_k T_s}(e^{-\lambda x_k T_s} - 1) & \text{Exp.distribution} \\[6pt] \dfrac{m^\alpha}{1-\alpha}(((b_k + x_k)T_s)^{1-\alpha} - (b_k T_s)^{1-\alpha}) & \text{Pareto distribution} \end{cases}$$

In the meantime, calculating an average collision time $\Psi_k$ for each distribution, it can be expressed as the following equation 9.

MathFigure 9 [Math. 9]

$$\Psi_k = \begin{cases} \dfrac{T_s^2}{2T_{max}}(2b_k x_k + x_k^2) & \text{Unif.distribution} \\ x_k T_s + e^{-\lambda b_k T_s}(e^{-\lambda x_k T_s} - 1) & \text{Exp.distribution} \\ x_k T_s - \dfrac{m^\alpha}{1-\alpha}(((b_k + x_k)T_s)^{1-\alpha} - (b_k T_s)^{1-\alpha}) & \text{Pareto distribution} \end{cases}$$

The aforedefined optimization method is a constrained optimization.

Accordingly the optimization problem can be solved by Karush-Kuhn-Tucker (KKT) condition which is the most standardized solution.

According to an optimization theory, all the optimization problems may be divided into convex optimization problem and non-convex optimization problem.

The optimization problem defined in Equation 7 may satisfy the convex optimization problem because an objective function is a concave objective function and constraint is a convex constraint function.

Therefore, if the KKT condition is met, the requirements for the optimal solution can be automatically satisfied. The optimal solution for each traffic distribution can be obtained by Equation 10 for the uniform distribution, Equation 11 for the exponential distribution and Equation 12 for the Pareto distribution.

MathFigure 10

$$x_k^{Unif*} = \min\left\{*-b_k + \sqrt{b_k^2 + \frac{2\eta T_{max}}{T_s^2}} +, *-b_k + \frac{T_{max}}{T_s} +\right\} \quad [\text{Math. 10}]$$

MathFigure 11

$$x_k^{Exp*} = *\frac{1}{\lambda T_s}\left(W\left(e^{-(\lambda b_k T_s + e^{-\lambda b_k T_s} + \lambda\eta)}\right) + e^{-\lambda b_k T_s} + \lambda\eta\right) + \quad [\text{Math. 11}]$$

Where W denotes a Lambert W function, wherein if Y is randomly given, X for satisfying Y=Xexp(X) is defined as X=W(Y).

MathFigure 12

$$x_k^{Par*} = \left\{x_k^* : x_k^* T_s - \frac{m^\alpha}{1-\alpha}((b_k + x_k^*)T_s)^{1-\alpha} - (b_k T_s)^{1-\alpha} = \eta\right\} \quad [\text{Math. 12}]$$

Where $x_k^*$ is a variable for obtaining a solution of the given equation.

If data slot length $x_k$ for the traffic transmission of the secondary user are defined through Equations 10 to 12, frame length for the transmission may be determined based upon the defined value.

Among others, for the Pareto distribution, since the equation of Equation 12 cannot be solved by an algebraic approach, such value can be calculated by a numerical analysis approach, for example, Secant method. The Secant method is developed to numerically find a root of an equation.

The Secant method needs two initial values and designates the next value by using a line intersecting a functional value for the two initial points, which can be repeated so as to obtain a point close to the final solution.

Figure 4:
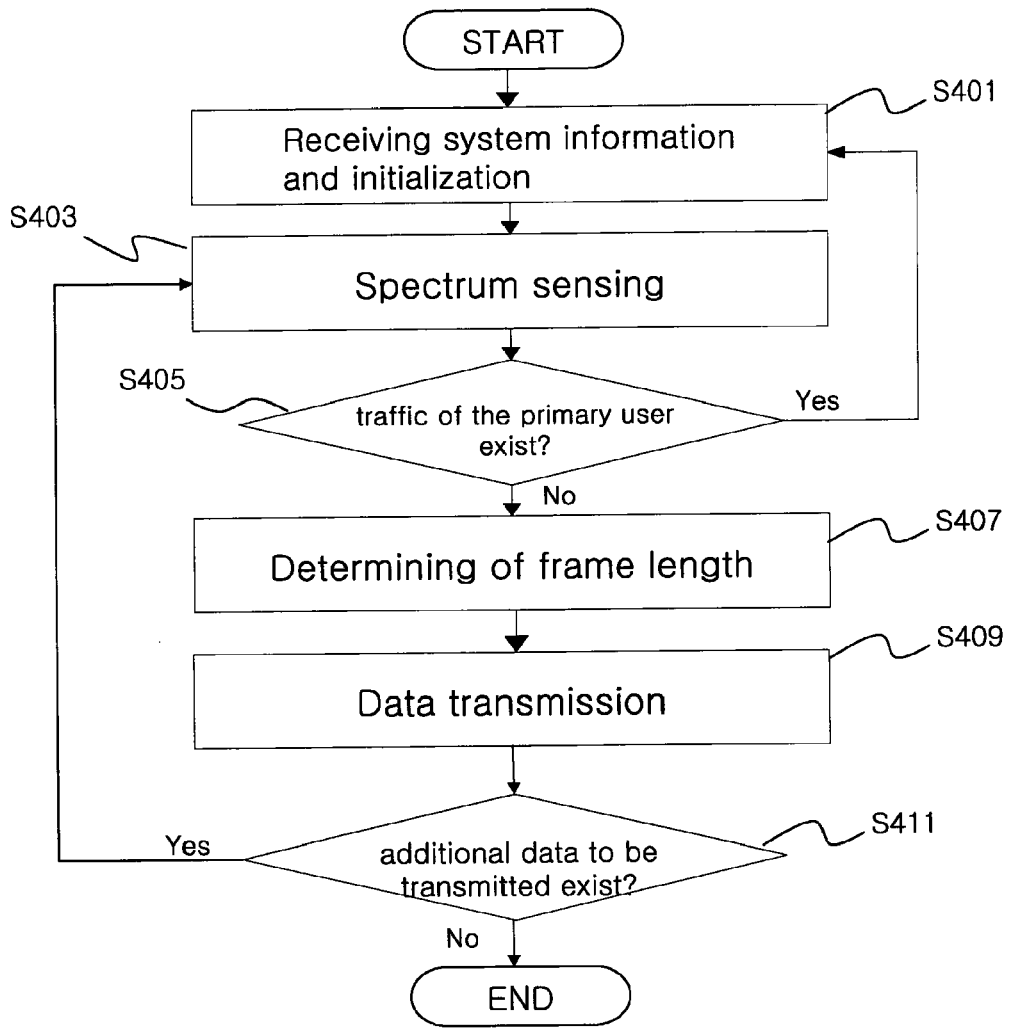
FIG. 4 shows a flowchart illustrating sequential data transmission steps through a spectrum sensing by a secondary user in accordance with one embodiment of the present invention.

FIG. 4 shows a flow chart illustrating sequential data transmission steps through a spectrum sensing by the second user in accordance with one embodiment of the present invention.

Prior to starting transmission, the secondary user receives system information including a traffic state relating to the primary user from a network and executes an initialization (S401).

The system information relating to the primary user's traffic state may include maximum idle period $T_{max}$, a minimum value m of a predetermined random variable, an average arrival rate $\lambda$ and a value $\alpha$ for determining average and dispersion. The traffic state information relating to the primary user may be measured by the secondary user itself.

After executing the initialization, the secondary user performs spectrum sensing to a corresponding channel for checking whether the primary user's traffic exists in the channel (S403).

If a data traffic of the primary user exists in the channel, the process is fed back to the step S401 so that the secondary user receives updated system information and executes re-initialization.

If a data traffic of the primary user does not exist in the channel, a frame length of the data transmission for the secondary user is decided based upon the traffic information of the primary user in order for the secondary user to transmit the traffic via the corresponding channel (S407).

The decision of the frame length may use Equations 10 to 12 as mentioned above. That is, among the equations obtained by the optimization for each traffic distribution, Equation 10 is employed for the uniform distribution, Equation 11 for the exponential distribution and Equation 12 for the Pareto distribution, thereby deciding the frame length of the secondary user.

Upon the frame length being decided, the secondary user starts data transmission via the corresponding channel (S409).

Upon the completion of the transmission, it is determined whether data to be transmitted still exists (S411), and if so, the spectrum sensing is re-performed (S403) for the corresponding channel so as to confirm whether the primary user has made its comeback to the corresponding channel. According to the result of the spectrum sensing, if a signal of the primary signal is sensed, the process is fed back to the initialization step to find another free channel, and if not, the frame length for the traffic transmission is decided and then the transmission is executed, as similar to the aforementioned.

The steps S403 to S411 are repeated as long as data to be transmitted of the secondary user is exist.

As aforementioned, by employing the method of deciding the frame length of the secondary user in consideration of the traffic arriving characteristic of the primary user according to the present invention, the transmission throughput of the secondary user can be improved with the lowest interference to the primary user, wherein the interference is less than a constrained threshold.

Figure 5:
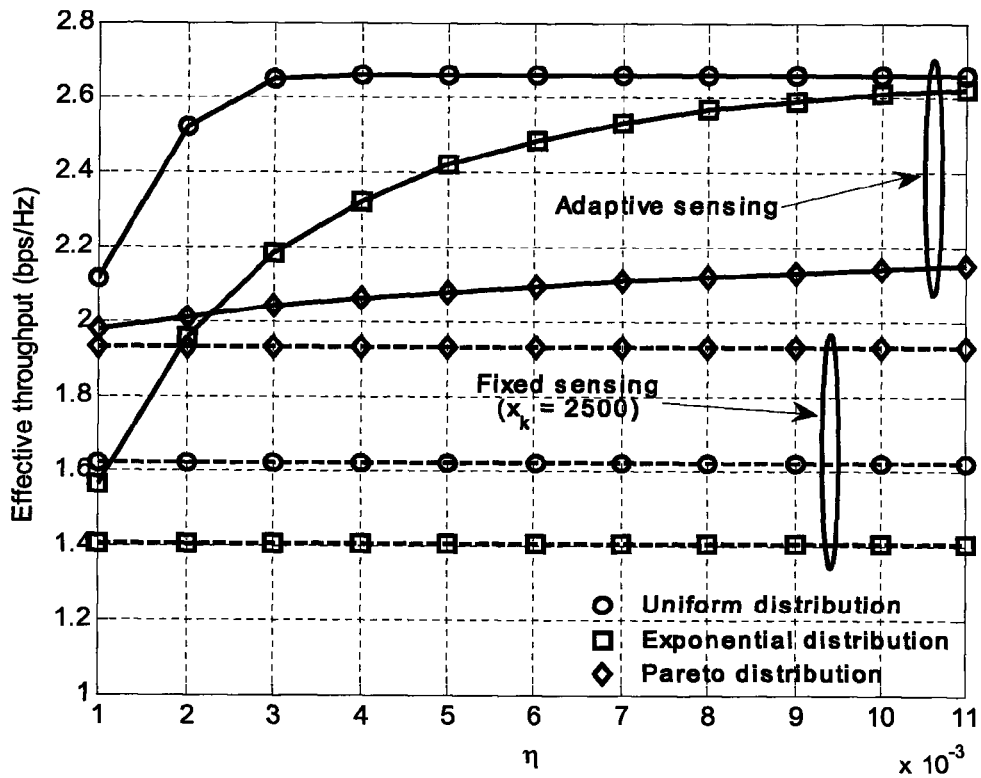
FIG. 5 shows a graph illustrating the relation between an effective throughput and an interference threshold value in accordance with one embodiment of the present invention.
Figure 6:
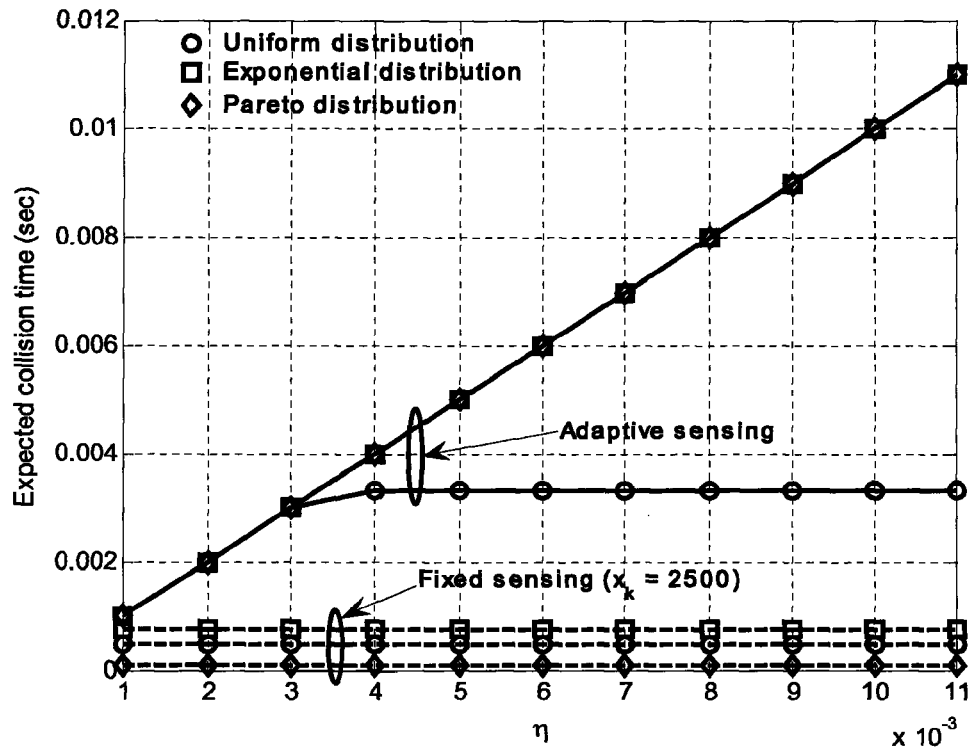
FIG. 6 shows a graph illustrating an average interference rate and an interference threshold value in accordance with one embodiment of the present invention.

FIGS. 5 and 6 show simulation results obtained by comparing the method proposed by the present invention with the related art technology.

In the condition for the simulation, it is assumed that a bandwidth of a channel is 1 MHz and a sensing slot length $n_D$ is 10 samples. Also, the same interference threshold value is assumed for every frames ($\eta_k=\eta$, k=0, 1, . . . , K−1).

Furthermore, as the primary user's traffic variables, an average idle period is assumed to be $1/\lambda=0.333$ sec and an average activity period is assumed to be $1/\mu=0.1$ sec. Also, a Pareto constant is decided as m=0.02 and $\alpha$=1.0683.

FIG. 5 shows the simulation results of an effective throughput with respect to an interference threshold value $\eta$ for the method according to the present invention and the related art technology, in order to compare the same.

As shown in the graph of FIG. 5, according to the method proposed by the present invention, the data slot length can reduce the collision time between the primary user and the secondary user and proceeds in a direction for optimizing the throughput. Also, as can be noticed in FIG. 5, the method proposed by the present invention can show the higher throughput than the existing method at most interference threshold values $\eta$. It can also be seen that as $\eta$ increases, the channel access time of the secondary user increases and thereby the throughput is also enhanced.

FIG. 6 shows the result of simulating an expected collision time with respect to the interference threshold value $\eta$ for employing the method proposed by the present invention and the existing method. As shown in FIG. 6, it can be noticed that the method proposed by the present invention can achieve the throughput as high as possible within the range of satisfying the threshold value limits.

The method proposed by the present invention may also be applicable to IEEE802.11 WLAN system. IEEE802.11 standard employs medium access control (MAC) protocol based upon a distributed coordination function (DCF). Also, fragmentation approach for segmenting MAC protocol data unit (MPDU) to improve transmission reliability and aggregation approach aiming at improving the throughput by decrease of overhead have been proposed. The fragmentation and the aggregation approaches serve to adjust a frame length so as to help improving error performance or throughput. Therefore, the adjustment of the frame length is necessary for creating an optimal transmission environment. In case of applying the method of adjusting the frame length according to the present invention to the WLAN system, upon configuring large unit of A-MPDU with smaller unit of MPDUs through the frame aggregation, the same sized A-MPDU is transmitted by the existing method whereas the method according to the present invention employs a technique of gradually reducing the A-MPDU length from the beginning of an empty space. Here, since the MPDU has a fixed size, the frame lengths calculated by Equations 10, 11 and 12 can be approximated to the multiple of subframes which are aggregated.

The method according to the present invention having described so far can be implemented by software, hardware or combination thereof. For instance, the method according to the present invention may be stored in a storage medium (for example, terminal internal memory, flash memory, hard disc, etc.) or be implemented as codes or command words within a software program executable by a processor (for example, microprocessor within a terminal).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. A data communication method in a frequency reuse communication system, the method comprising:
   collecting channel status information for a predetermined frequency band that is licensed or allocated to a primary user by receiving the channel status information from a base station or by measuring the channel status;
   executing spectrum sensing for the predetermined frequency band to check whether the primary user's traffic exists;
   retrieving a channel in which the primary user's traffic is not present based upon the spectrum sensing;
   deciding a length of a frame of data to be transmitted in consideration of interference to the primary user based upon the collected channel status information;
   transmitting the data based upon the decided frame length through the retrieved channel; and
   re-executing the spectrum sensing for the channel, if data to be additionally transmitted exists, and checking whether the primary user's traffic exists,
   wherein the channel status information comprises data traffic information of the primary user, and
   wherein the data traffic information of the primary user is based upon a uniform distribution, and the data traffic information of the primary user comprises a maximum idle period of the data traffic.

2. The method of claim 1, wherein the data to be transmitted is divided into a plurality of frames, and a length of each of the divided frames becomes gradually shorter than a length of the initially-divided frame.

3. The method of claim 1, wherein the data traffic information of the primary user is based upon a Pareto distribution, and the data traffic information of the primary user comprises a minimum value m of the traffic idle period of the primary user, and a determination value a for determining average and dispersion.

4. The method of claim 3, wherein a number of frames to be transmitted is K, a beginning time of the $k^{th}$ data slot is $b_k$, an average collision time limit is $\eta$, and a symbol period is $T_s$, the frame length $x_k^{Exp^*}$ decided at the step of deciding the length of data frame to be transmitted is defined by the following equation, $$x_k^{Exp^*} = \left\{ x_k^* : x_k^* T_s - \frac{m^\alpha}{1-\alpha}((b_k + x_k^*)T_s)^{1-\alpha} - (b_k T_s)^{1-\alpha}) = \eta \right\}.$$

5. The method of claim 4, wherein the decision of the length of the data frame to be transmitted is calculated by a secant method.

6. A data communication apparatus in a frequency reuse communication system, the apparatus comprising:
   a receiver for receiving a channel status information for a predetermined frequency band that is licensed or allocated to a primary user;
   a spectrum sensing unit configured to execute spectrum sensing for the frequency band to check whether data traffic of the primary user exists;
   a controller configured to receive the sensed result from the spectrum sensing unit, retrieve a channel in which the primary user's traffic is not present based upon the sensed result, and decide a frame length of data to be transmitted in consideration of interference to the primary user based upon the received channel status information from the receiver; and

- a transmitter for transmitting the data based upon the decided frame length through the channel;
- wherein the controller divides the data to be transmitted into a plurality of data frames, and a length of each of the divided data frames becomes gradually shorter than a length of the initially-divided frame,
- wherein the channel status information of the primary user comprises data traffic information, and
- wherein the data traffic information of the primary user is based upon a uniform distribution, and the data traffic information of the primary user comprises a maximum idle period of the data traffic.

7. The apparatus of claim 6, wherein the data traffic information of the primary user is based upon a Pareto distribution, and the data traffic information of the primary user comprises a minimum value m of the traffic idle period of the primary user, and a determination value .alpha. for determining average and dispersion.

* * * * *